United States Patent [19]

Forshee

[11] 4,433,627
[45] * Feb. 28, 1984

[54] PLASTIC CONVEYOR TROLLEY WITH BEARINGS

[75] Inventor: David J. Forshee, Oxford, Mich.

[73] Assignee: Formall Syn-Trac Systems, Inc., Madison Heights, Mich.

[ * ] Notice: The portion of the term of this patent subsequent to Oct. 21, 1997 has been disclaimed.

[21] Appl. No.: 287,884

[22] Filed: Jul. 29, 1981

[51] Int. Cl.³ .............................................. B61B 3/00
[52] U.S. Cl. ......................................... 104/95; 16/107; 105/154; 198/687; 308/216
[58] Field of Search ........................ 104/95, 89, 91, 94, 104/172 S; 105/148, 154, 155; 198/477, 683, 684, 685, 687; 16/91, 97, 107; 308/182, 203, 206, 207 R, 208, 209, DIG. 7, 216, DIG. 8

[56] References Cited

U.S. PATENT DOCUMENTS

| | | | |
|---|---|---|---|
| 1,367,706 | 2/1921 | Loudenslager | 105/154 |
| 1,429,118 | 9/1922 | Townsend | 105/154 |
| 2,010,362 | 8/1935 | Herrmann et al. | 308/207 R |
| 2,073,131 | 3/1937 | Webb | 104/94 |
| 2,101,951 | 12/1937 | McInnis | 198/687 |
| 2,770,508 | 11/1956 | Smith | 308/208 |
| 4,228,738 | 10/1980 | Forshee | 104/95 |

FOREIGN PATENT DOCUMENTS 1380363  1/1975  United Kingdom ............... 308/216

OTHER PUBLICATIONS

DuPont Publication *Zytel Nylon Resin,* Jul. 16, 1959.

*Primary Examiner*—Robert B. Reeves
*Assistant Examiner*—Donald Hajec
*Attorney, Agent, or Firm*—Benjamin W. Colman

[57] ABSTRACT

A plastic conveyor trolley structure having plastic bearings and made of a super tough plastic material, comprises a pair of complementary arms each supporting a wheel for rotation on roller bearings held in a fixed inner race forming an integral part of a stub axle on which the trolley wheel is rotatable. The trolley is readily movable on the flanges of an I-beam monorail. A pendant member secured to and between the lower ends of the trolley arms is engaged by the conveyor drive chain to move the trolley along on the monorail. Metal screws are used to hold the depending member to the arms and to secure the stub axle for the trolley wheel to its supporting arm.

8 Claims, 8 Drawing Figures

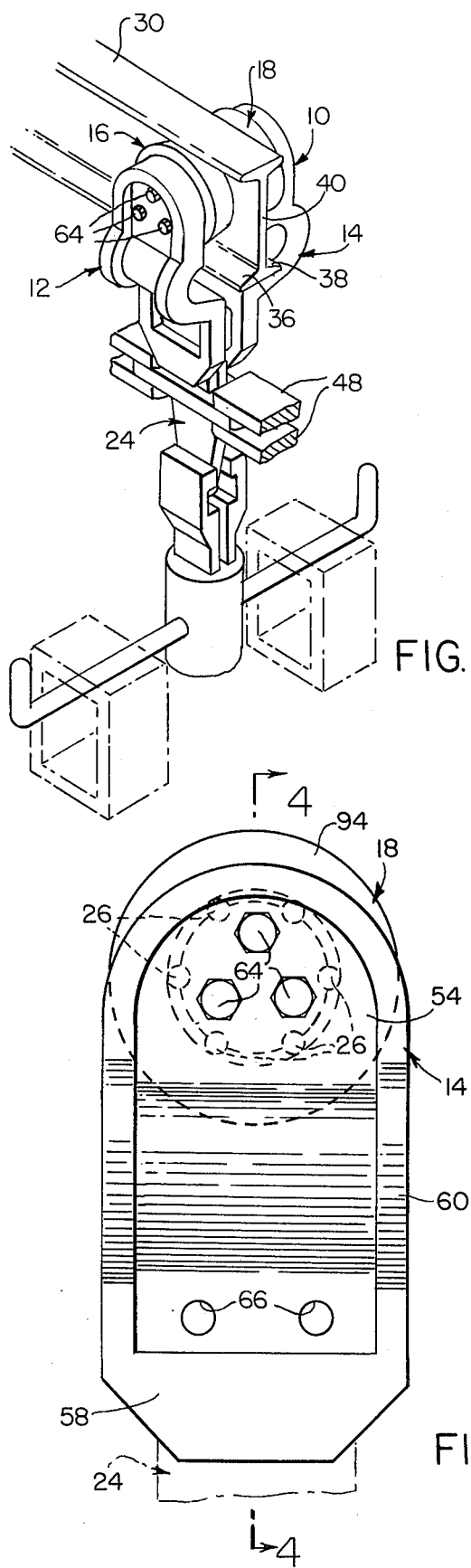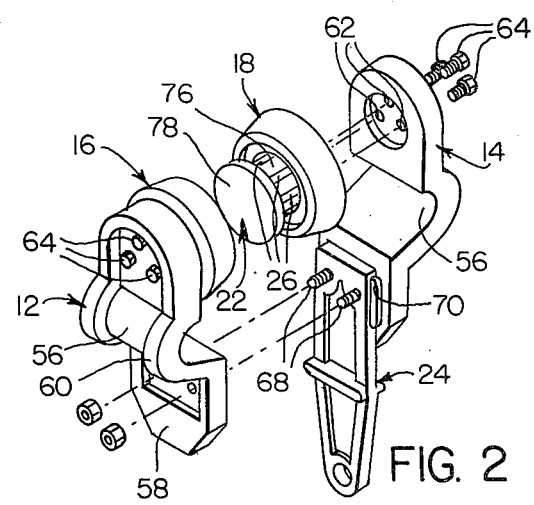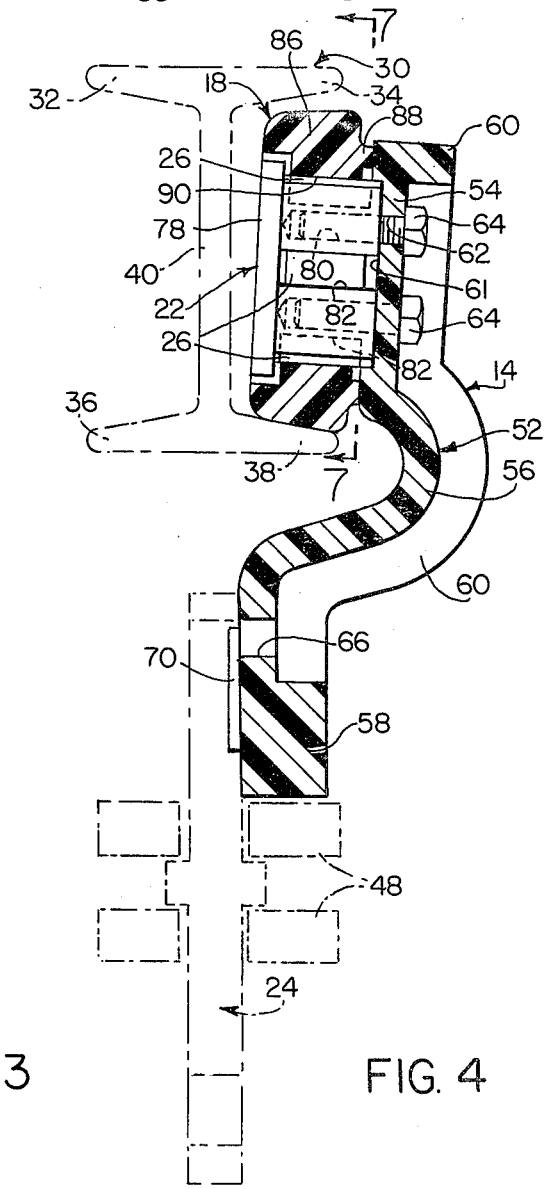

PLASTIC CONVEYOR TROLLEY WITH BEARINGS

REFERENCE TO RELATED PATENT

This invention is related to my earlier filed application Ser. No. 944,806, filed Sept. 22, 1978, which issued as U.S. Pat. No. 4,228,738, on Oct. 2, 1980, entitled "Conveyor Trolley Construction."

BACKGROUND OF THE INVENTION

Heretofore, conveyor chain-driven trolleys have been made of steel and metallic components requiring considerable and expensive lubrication installations and maintenance. Such trolleys are of very substantial weight, adding materially to the load on the conveyor and consequent high energy consumption, having a relatively short service life before replacement or service maintenance is required, readily subject to corrosion and early failure in certain chemically active environments, and having other limitations which the instant invention avoids.

Among the advantages achieved by the conveyor trolley structure of this invention are a. The coefficient of friction of the plastic material used in the trolley stub axle, bearings and wheel components is extremely low and thus lubrication of the moving parts is not required. This feature also eliminates expensive lubrication equipment, facilities, installations and maintenance. In addition, in some applications, as for instance in food processing plants, the elimination of lubricants removes the possibility of such contaminants dripping upon fresh or processed foods carried by or located under the conveyor system.

b. There is a weight reduction of about 80% or more for the new plastic trolleys, in comparison to the currently used steel trolleys. This weight reduction not only extends the wear life of the monorail itself and the service life of the entire conveyor system, it will also lower the size requirements for the drive motors and mechanism with consequent reduction in energy consumption. The current service life of steel trolley conveyor systems is estimated to be from about 5 to 7 years. The inventive plastic trolley construction should at least double the service life of the monorail system.

c. The plastic trolley construction of this invention is extremely advantageous in areas where severely corrosive chemical vapors are present, such for example where caustic wash solutions are sprayed, causing a breakdown in lubrication which in turn destroys the roller bearings in the present steel trolley assemblies. The same results occur in the presence of phosphate solutions. Millions of dollars are being spent to automatically lubricate overhead monorail conveyor systems and to seal off the trolley assemblies while they pass through these severely corrosive areas.

d. By virtue of its design, the inventive trolley construction permits lower replacement cost for any component. This is not true for the presently used steel assemblies. For example, if a steel ball bearing trolley wheel should fail, not only the wheel but the entire side arm must be replaced. In the instant invention, the individual unitary components are simply and readily replaceable, at a very substantially lower cost.

e. Because of the low coefficient of friction for the plastic pendant member secured to the trolley arms, the holes in these pendants, from which the trolley hanger rods are secured by metal screws, will not become elongated due to wear. If the pendant becomes overstressed, it will simply break at the hole.

f. The plastic trolley construction effects a tremendous reduction in decible readings for the conveyor zone, a great advantage in terms of noise abatement and/or pollution. Overhead steel trolley monorail installations, particularly if they are old, become extremely noisy due to mismatches and unevenness in weld joints along the I-beam monorail.

g. In certain installations of the plastic conveyor trolley having a stub axle and wheel according to the disclosure in U.S. Pat. No. 4,228,738, it was found that the energy load required to initiate movement of the conveyor system was somewhat higher than that required to initiate conveyor translation of the conventional steel trolley system, although once the conveyor system was in motion the energy load to maintain movement of the plastic trolleys was lower than that for the steel trolley system.

The plastic trolley construction of this invention has some additional advantages.

(1) The plastic conveyor trolley with roller bearings reduces the initial drag of the plastic stub axle and wheel combination on start-up of the conveyor system. Only line, not surface contact, is made by the plastic roller bearings on the plastic stub axle and plastic wheel, thereby significantly reducing the initial pull load of the conveyor system.

(2) The super tough nylon plastic resin allows for engineering a precision assembly. No secondary drilling of holes or alignment of details need be performed prior to attaching the trolleys to the monorail.

(3) Color coding of the plastic trolley assemblies will enable part identification to be more readily made on mixed model conveyor installations. Also, the assemblies can be colored brightly to signal a moving object, even though color coding may not be required under OSHA specifications.

(4) By designing the trolley components of the moldable Zytel ®ST 801 plastic nylon material, the trolley arms, stub axle, roller bearings, wheels and pendant member are each engineered to be readily replaceable in minutes, resulting in minimum downtime of the conveyor system.

The Zytel ®ST 801 plastic nylon material, used in the fabrication of applicant's trolley components, is a super tough nylon resin material produced by E. I. DuPont de Nemours & Co. (Inc.) of Wilmington, Del. 19898. Another material which can be used for the roller bearings is DuPont's Delrin ® crystalline plastic, an acetal resin material made by the polymerization of formaldehyde. The Zytel ® plastic resin can be mixed with a fiber glass concentrate to add further strength to the nylon material. The amount of such fiber glass additive is proportional to the weight load of the conveyor trolley assembly. As the load or weight requirements of the trolley assembly increase, the percentage of fiber glass used with the nylon resin is also increased.

SUMMARY OF THE INVENTION

The invention involves a conveyor trolley construction comprising a pair of plastic trolley arms arranged in opposed facing relationship, a plastic trolley wheel removably mounted for free rotation upon a plastic stub axle removably secured to the inner face of each trolley arm, a plurality of plastic roller bearings radially disposed in axially parallel relationship to and upon the perimeter of the stub axle, and a depending plastic member removably secured to the lower ends of the trolley arms therebetween.

The trolley wheels are designed to run upon the lower or upper horizontal flanges of a conveyor-type I-beam monorail. The stub axles supporting the trolley wheels for rotation thereon are removably secured to the trolley arms by screws passed through openings in the arms from their outer sides. The roller bearings rotate in axially parallel recesses at the perimeter of the stub axle. The plastic depending member, designed for suspending a parts hanger therefrom, is disposed between and secured to the lower portions of the trolley arms and below the I-beam flanges, by screws. The conveyor drive chain, formed of a series of links, engage and are connected to the depending member to draw the trolley assembly along and upon the monorail flanges.

BRIEF DESCRIPTION OF THE DRAWINGS

Various further and more specific objects, features and advantages of the invention will appear from the description given below, taken in conjunction with the accompanying drawings, illustrating by way of example preferred forms of the invention. Reference is here made to the drawings annexed hereto and forming an integral part of this specification, in which FIG. 1 is a perspective view of the conveyor trolley construction embodying a preferred form of the invention.

FIG. 2 is an exploded perspective view of the embodiment illustrated in FIG. 1.

FIG. 3 is a front or outer elevational view of the trolley arm and wheel assembly.

FIG. 4 is a vertical section view of the trolley arm taken substantially on the line 4—4 of FIG. 3.

DESCRIPTION OF THE PREFERRED EMBODIMENTS

Figure 5:
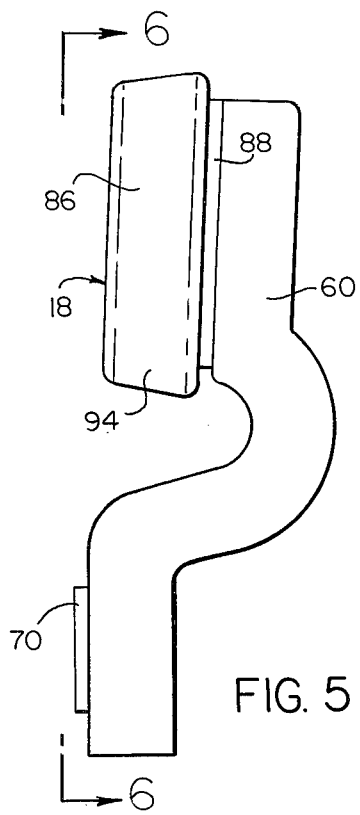
FIG. 5 is a side elevational view of the trolley arm and wheel assembly illustrated in FIGS. 3 and 4.
Figure 6:
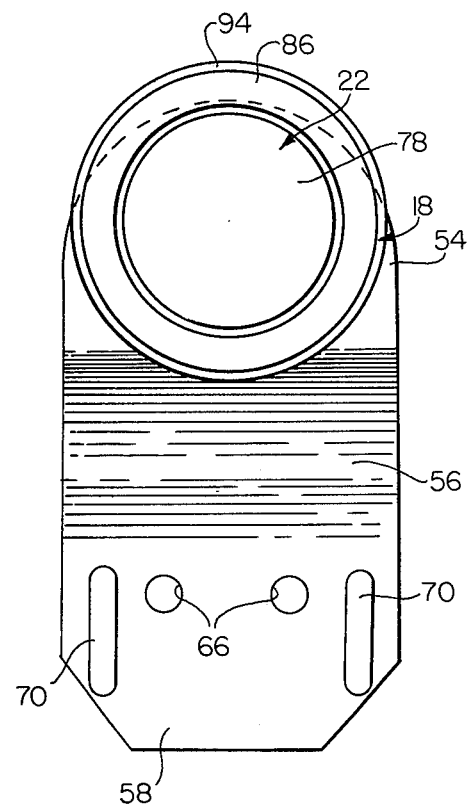
FIG. 6 is an elevational view of the arm and wheel assembly taken substantially on the line 6—6 of FIG. 5.

As illustrated in the several views of the drawings, the plastic conveyor trolley with bearings construction 10 comprises a pair of trolley arms 12, 14 (left- and right-hand), a pair of trolley wheels 16, 18 for the respective trolley arms, a pair of stub axles 20, 22 for the respective wheels, a plurality of plastic roller bearings 26 rotatable in recesses of the stub axles, and a pendant member 24.

The trolley assembly 10 is designed to operate upon an I-beam monorail 30 having upper horizontally disposed flanges 32, 34 and lower horizontally disposed flanges 36, 38, and a vertical web 40 therebetween. The inner surfaces of these flanges are disposed at a slight angle to the horizontal plane, as shown in FIGS. 1 and 4. The outer surface of the trolley wheels engaging the monorail flange surfaces, the axial attitude of the stub axle and the vertical attitude of that portion of the trolley arm supporting the stub axle and the trolley wheel are canted outwardly to compensate for the angle of those flange surfaces.

The trolley assemblies 10 are propelled along the monorail 30 by a conventional conveyor drive chain 48 having links which engage the trolley assembly at the pendant member 24.

The trolley arms 12, 14 are substantially identical so that they can be used as either a left-hand or right-hand element. The arm comprises a body 52 having a stub axle support portion 54, an intermediate web section 56, a lower pendant portion 58, and a peripheral rim or flange 60. The stub axle support portion 54 is provided with a recess or counterbore 61 to seat the stub axle 20 or 22. Some two or three holes 62 are disposed through the support portion 54 for screws 64 which engage and secure the stub axle 20 or 22 to the body support portion 54. The pendant portion 58 is also provided with a pair of holes 66, 66 through which screws 68, 68 are passed to secure the pendant member 24 therebetween. The inner surface of the trolley arms 12, 14 in the pendant portion 58 is provided with a pair of outwardly projecting spaced apart flanges or ribs 70, 70 that engage the pendant member 24 laterally and prevent it from rotation about the screws 68, 68.

Figure 8:
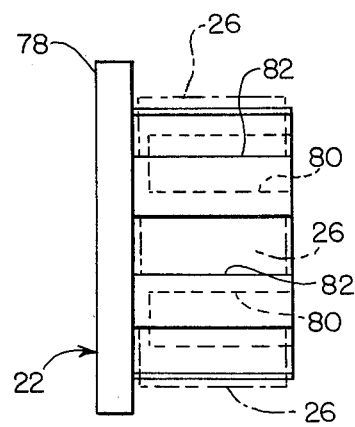
FIG. 8 is a side elevational view of the stub axle illustrated in FIG. 7.

The stub axles 20, 22 are substantially identical and each comprise a hub section 76 and a radially outwardly extending flange 78 at the distal end of the hub section, as shown particularly in FIGS. 4 and 8. The hub section is provided with threaded holes 80 to receive and engage the screws 64 passed through the axle support portion holes 62 from the outer side of the axle support portion 54.

Figure 7:
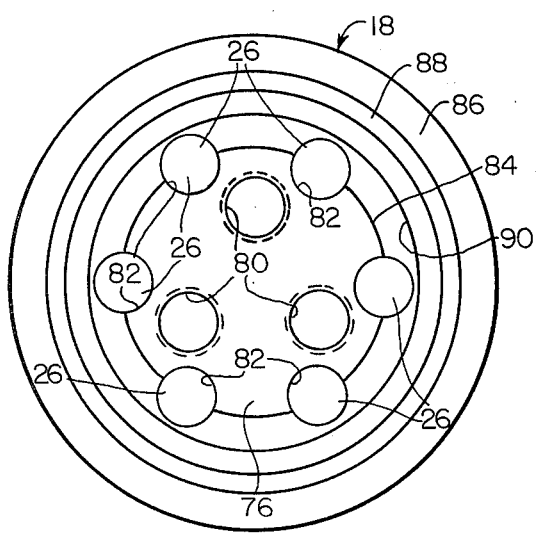
FIG. 7 is a vertical sectional view taken substantially on the line 7—7 of FIG. 4.

The hub section 76 is further provided with a plurality of longitudinally extending arcuate notches or recesses 82 disposed in axially parallel and spaced substantially equally radially apart relationship in its perimeter 84. The recesses 82 extend from the proximal end of the stub axle hub section, as shown clearly in FIGS. 1, 7 and 8. The plastic roller bearings 26 lie in these recesses (FIG. 7), and rotate therein when engaged by body 86 of wheel 16 or 18 at its bore 90. The bearings 26 are slightly shorter in length, by approximately 1/32 inch, than the length of the recesses 82 in which they lie. Also, the bearings have a slightly smaller diameter, approximately 0.010–0.015 inch, than the diametric dimension of the recesses, whereby each bearing ideally makes a line contact with the recess surface in which it lies and rotates. The stub axle section 76 with its recesses 82 thus functions as a support bearing or fixed race for the roller bearings 26, as shown particularly clearly in FIGS. 2, 4 and 7.

The trolley wheels 16, 18 are substantially identical and each comprise a body 86, an annular flange 88 on its rearward side, a bore 90 for the stub axle hub portion 76, and a counterbore 92 for the stub axle outer flange 78. The outer annular surface 94 of the wheel is tapered so as to ride in a vertical attitude upon the upper surfaces of the monorail lower flanges 36, 38 and the lower surfaces of the upper flanges 32, 34. The frictional coefficient of the Zytel ®ST nylon material or the Delrin ® acetal resin material is low and lubricant for the bearings or the wheel is not required.

In assembling the conveyor trolley 10 for operation on the monorail, the upper portion of the pendant member 24 is first passed through the drive chain linkage until the intermediate ribs abut the drive chain link. The trolley arms 12, 14, with wheels 16, 18 disposed on their respective stub axles 20, 22 and about the bearings 26 therewithin, are then attached to the pendant member 24 on each side thereof by screws 68, 68, wheels 16, 18 resting upon the upper surfaces of the I-beam monorail lower flanges 36, 38. The annular flange 78 thus functions as a retainer for the trolley wheel 16/18, as shown clearly in FIGS. 2 and 4. When thus assembled, a hanger device can be suspended from and attached to the lower end of the pendant member 24. To disengage the trolley assembly 10 from the monorail, screws 64 at the outer side of each trolley arm are removed from its stub axle, allowing the wheels, stub axles, and bearings to simply part from the arms.

Each of the principal components of the trolley structure 10 are molded of the Zytel ®ST 801 nylon material, the bearings being preferably molded or extruded of Zytel ® or Delrin ® plastic material. The fastening screws 64 and 68, preferably of metal, may also be made of a suitable plastic material to meet the needs of certain applications.

Having disclosed herein a certain particular preferred embodiment of the invention for purposes of explanation, further modifications or variations thereof, after study of this specification, will or may occur or become apparent to persons skilled in the art to which the invention pertains. Reference should be had to the appended claims in determining the scope of the invention.

I claim:

1. In an improved trolley assembly for operation in an I-beam monorail conveyor system, said trolley assembly being provided with a pair of detachably connected spaced apart unitary integrally formed molded plastic trolley arms, a unitary integrally formed molded plastic stub axle easily removably attached to each said trolley arm upon and adjacent the inward face of an upper portion of said arm, a unitary integrally formed molded plastic trolley wheel rotatably mounted on each said stub axle and retained by said stub axle on the inward side of said trolley arm, removable fastening means extending through said trolley arm upper portion from its outer side and into the body portion of said stub axle fixedly securing said stub axle to said upper portion inward face against rotation, wherein the improvement comprises each said stub axle having a body portion, the perimetric surface of which is notched with a plurality of axially parallel radially spaced apart longitudinally extending recesses, a cylindrical plastic roller bearing disposed and rotatable in each said recess, each said wheel being rotatably supported on said bearings and retained by said stub axle on the inward side of said trolley arm upper portion.

2. The improved trolley combination defined in claim 1, wherein said stub axle bearing recesses are disposed in substantially equally spaced apart radial relationship.

3. The improved trolley combination defined in claim 1, wherein said recesses extend from the proximal end of said stub axle, and have a substantially semi-circular or arcuate cross-sectional configuration.

4. The improved trolley combination defined in claim 1, wherein the outer perimeters of said roller bearings define a circle of rotation extending beyond the perimeter of said stub axle on which they are rotatable and within the inner annular bore of said wheel.

5. The improved trolley combination defined in claim 1, wherein said stub axle comprises a hub portion and an annular radially outwardly extending flange at the distal end of said hub portion, the proximal end of said hub portion being secured to and upon said trolley arm upper portion, said recesses extending from the proximal end of said hub portion to said annular flange.

6. The improved trolley combination defined in claim 5, wherein said stub axle hub portion functions as a support bearing or fixed race for said roller bearings.

7. The improved trolley combination defined in claim 5, wherein said annular flange functions as a retainer for said trolley wheel and said roller bearings when said stub axle is secured to said trolley arm upper portion.

8. The improved trolley combination defined in claim 1, and including means in said stub axle hub portion engagable by said fastening means to removably secure said stub axle to said trolley arm upper portion.

* * * * *

UNITED STATES PATENT AND TRADEMARK OFFICE
Certificate

Patent No. 4,433,627                      Patented February 28, 1984

David J. Forshee

Application having been made by David J. Forshee, the inventor named in the patent above identified, and Formall Syn-Trac Systems, Inc., the assignee, for the issuance of a certificate under the provisions of Title 35, Section 256, of the United States Code, deleting the name of David J. Forshee and adding the name of James S. Salloum as the inventor, and a showing and proof of facts satisfying the requirements of the said section having been submitted, it is this 18th day of Sept., 1984, certified that the name of the said David J. Forshee is hereby deleted from the said patent and the name of the said James S. Salloum is hereby added to the said patent as the inventor.

Fred W. Sherling,
*Associate Solicitor.*